UNITED STATES PATENT OFFICE 2,202,902

COLORATION OF TEXTILE AND OTHER MATERIALS

George Holland Ellis and Henry Charles Olpin, Spondon, near Derby, England, assignors to Celanese Corporation of America, a corporation of Delaware No Drawing. Application October 2, 1937, Serial No. 166,970. In Great Britain October 12, 1936

22 Claims. (Cl. 260—457)

This invention relates to improvements in the coloration of textile and other materials, and particularly of materials containing organic esters and ethers of cellulose.

It has been discovered that substances which are sulphate esters of aromatic compounds (other than azo compounds and amino substituted anthraquinones) containing a hydroxyalkyl group, a nuclear nitro group and an auxoalkyl chrome group have very valuable dyeing properties, particularly for textile and other materials containing organic esters and ethers of cellulose, and the present invention includes the manufacture of these dyestuffs, the dyestuffs themselves, processes for the coloration of materials with the dyestuffs and the colored materials obtained.

The dyestuffs may be sulphato esters of relatively simple compounds containing only a single aryl nucleus, e. g., 4-chlor-2-nitro-1-(β-hydroxyethyl) amino-benzene having the structural formula

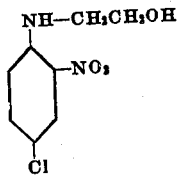

2,4-dinitro-1-(β-hydroxyethyl) amino-benzene having the structural formula

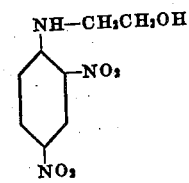

and other nitro-hydroxyalkylamino-benzenes, toluenes and naphthalenes. Of particular importance, however, are dyestuffs which contain two or more aryl nuclei linked together directly, as in diphenyl and similar diaryl compounds, or indirectly, e. g., through an oxygen atom, a sulphur atom or a —NH—, —CH₂—, —CO—, —CO—NH—, or other group. Special mention may be made of compounds containing more than one aryl nucleus and containing nitro and hydroxyalkyl groups either in the same nucleus, e. g., as in the sulphato esters of 3-nitro-4-(β-hydroxyethyl) amino-diphenyl having the structural formula

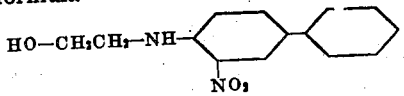

and of 1-benzoylamino-3-(β-hydroxyethyl) amino-4-nitrobenzene having the structural formula

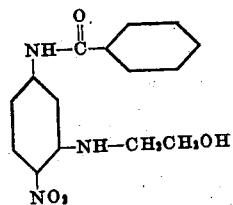

or in different nuclei, e. g., as in the sulphato esters of 2,4-dinitro-4'-(β-hydroxyethyl) amino-diphenylamine having the structural formula

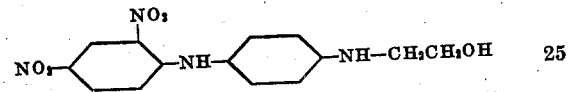

and in the sulphato esters of other N-substitution derivatives of 2,4-dinitro-4'-amino-diphenylamine wherein one or both hydrogen atoms of the 4'-amino group is substituted by a hydroxyalkyl group. When only one hydrogen atom of an amino group is replaced by a sulphato-alkyl group the other hydrogen atom may or may not be replaced by another organic radicle, e. g., an alkyl group, as, for instance, a methyl or ethyl alkyl group. In all these compounds the auxochrome group. In all these compounds the auxochrome group necessary to the dyestuffs of the present invention is the amino group. However, other auxochrome groups may be present, e. g., phenolic groups.

Of especial importance according to the present invention are dyestuffs in which the nitro group is the sole chromophore group.

The sulphato-alkyl groups present in the dyestuffs of the present invention may be directly linked to an aryl residue or may be linked to an aryl residue through nitrogen, as in the case of the sulphato esters of hydroxyalkylamino compounds mentioned above, through oxygen, as in the case of the sulphato esters of hydroxyalkyl ethers, or through sulphur, as in the case of the sulphato esters of hydroxyalkyl thioethers. Examples of such compounds are the sulphato esters of nitro anthraquinone derivatives which contain a hydroxyalkyl group linked to the aryl nucleus through oxygen or sulphur and an auxochrome group other than an amino group.

The dyestuffs may contain a single sulphatoalkyl group or may contain two or more sulphatoalkyl groups attached to the same aryl nucleus or to different aryl nuclei. Again, two sulphatoalkyl radicles may be linked to an aryl nucleus through the same nitrogen or other atom as, for example, in the case of the di-sulphato esters of di-(hydroxyalkyl) amino-aryl compounds. Furthermore, the dyestuffs may contain two or more sulphato ester groups attached to the same alkyl radicle, as in the case of the disulphato esters of aryl compounds containing β-γ-dioxy-propyl-amino radicles.

The dyestuffs may contain, in addition to the above mentioned radicles, other suitable constituents, e. g., halogen atoms and alkyl, alkoxyl, amino and acidylamino groups.

The dyestuffs of the present invention may be produced by various processes. Thus an aromatic compound containing a nuclear nitro group, an auxochrome group and a hydroxyalkyl group may be converted into the corresponding sulphuric acid ester by sulphation, e. g., by treatment with concentrated sulphuric acid. Again, a sulphate-alkyl group may be introduced into a nitro-aromatic compound containing an amino group, or both a hydroxy or mercapto group and another auxochrome group, e. g., an amino group, by means of a sulphato-alkylating agent, e. g., a halogen alkyl sulphate such as β-chlor-ethyl-sulphate.

Dyestuffs containing more than one aryl group may be synthesised by reacting an aryl compound containing a halogen atom with an aryl compound containing an amino group containing an available hydrogen atom so as to eliminate said halogen atom and said hydrogen atom, at least one of such aryl compounds containing a nuclear nitro group and at least one of said aryl compounds containing a sulphato-alkyl group. Thus, for example, 2,4-dinitro-chlorbenzene may be reacted with 1-amino-4'N.ethyl-sulphato-ethyl-amino-benzene in the presence of alkali so as to form 2,4-dinitro-4'N.ethyl-sulphato-ethyl-amino-diphenylamine

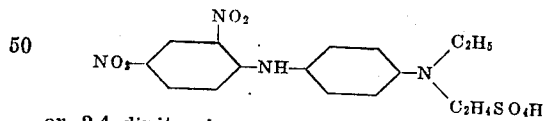

or 2,4-dinitro-benzoyl chloride may be reacted with 1-amino-4N.ethyl-sulphato - ethyl - amino-benzene in the presence of alkali so as to form 4-(2',4'dinitrobenzoyl-amino)-N.ethyl - sulphato-ethyl-aniline having the structural formula

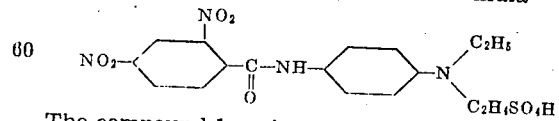

The compound 1-amino-4N.ethyl-sulphato-ethyl-amino benzene may be prepared, for example, by diazotising sulphanilic acid, coupling it with ethyl-β-hydroxyethyl aniline, reducing the azo compound so as to regenerate the sulphanilic acid and separating off the 1-amino-4-N.ethyl-β-hydroxyethyl-amino-benzene

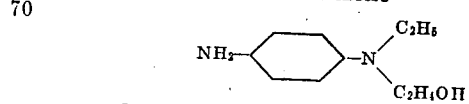

so produced. By treating this derivative with strong sulphuric acid the corresponding sulphato ester is obtained. This method of production may be varied by effecting the sulphation of the ethyl-β-hydroxyethyl aniline before coupling it with the diazotised sulphanilic acid; the final sulphation step is then unnecessary. The introduction of hydroxyalkyl groups into aryl compounds in order to form compounds from which the dyestuffs of the present invention may be produced by sulphation may be effected by reacting the aryl compounds with ethylene chlorhydrin, glycerine chlorhydrin and similar compounds.

The dyestuffs may be applied to the materials by any suitable method, for example, by immersing the materials in a bath containing the dyestuffs and Glauber's salt or by mechanical impregnation, printing or stencilling. In printing, the dyestuff may be mixed with a thickening agent, for example gum arabic, dextrin or the like, and the paste may be applied, for example, by printing with engraved rollers or through stencils, and the prints may afterwards be dried, steamed, aged and finished.

The dyestuffs may be employed in conjunction with other dyestuffs or coloring matters and any other substances, according to the particular products required, and they may be employed in the coloration of materials made of or containing cellulose acetate, propionate, butyrate and other esters and mixed esters of cellulose, in the coloration of effect threads obtained by the partial acetylation of cotton or regenerated cellulose or by treating alkalised cotton with a toluene sulpho chloride, or in the coloration of cellulose ethers, e. g., ethyl, butyl and benzyl celluloses. They may also be employed in the coloration of materials containing cellulose derivatives together with other materials, for example, cotton and other cellulosic fibres, wool and real silk, or in the coloration of materials which do not contain cellulose derivatives as, for example, the coloration of wool or silk fabrics.

The following examples illustrate the invention but are not to be regarded as limiting it in any way:

EXAMPLE 1

*The manufacture of 2,4 dinitro 4' ethyl sulphato-ethyl amino diphenylamine having the structural formula*

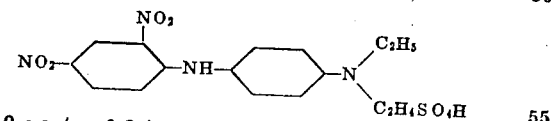

10 parts of 2,4-dinitro-4'-(N-ethyl-β-hydroxy-ethyl-amino)-diphenylamine prepared, for example, as described in Example 3 are dissolved in 100 parts of sulphuric acid of 96% concentration, the temperature being kept below 30° C. The solution is stirred for two hours and then poured into an excess of water, the dyestuff then being precipitated.

EXAMPLE 2

*The manufacture of 2,4 dinitro 4' sulphato ethoxy diphenylamine having the structural formula*

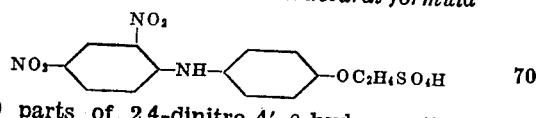

10 parts of 2,4-dinitro-4'-β-hydroxy-ethoxy-diphenylamine are introduced into 100 parts of sulphuric acid of 96% concentration, the temperature being maintained below 30° C. The solution is then poured into ice cold water and the precipitated sulphato ester is separated.

EXAMPLE 3

The manufacture of 2,4 dinitro 4' ethyl-β-hydroxy ethyl-amino diphenylamine having the structural formula

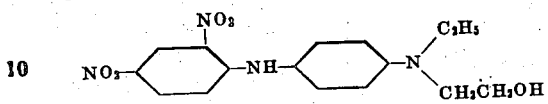

Sulphanilic acid is diazotised and coupled with ethyl-β-hydroxyethyl-aniline in the ordinary way. The resulting azo dyestuff is reduced in aqueous solution and a mixture of 4-amino-N.ethyl-β-hydroxyethyl-aniline and regenerated sulphanilic acid thus obtained. To the solution is added 2,4 dinitro-chlorbenzene in a sufficient quantity to condense with both the sulphanilic acid and the 4-amino-N.ethyl-β-hydroxyethyl-aniline. The condensation proceeds rapidly at 60° C. The 2,4-dinitro-4'-ethyl-β-hydroxyethyl-amino-diphenylamine is precipitated out and collected, the sulphanilic acid condensation product remaining in solution as the sodium salt. The dyestuff obtained is then recrystallised from solution in a mixture of pyridine and methylated spirit.

EXAMPLE 4

The dyeing of cellulose acetate materials 3 parts of 2,4-dinitro-4'-sulphato-ethoxy-diphenylamine are dissolved in 3000 parts of water and the solution warmed to 45° C. 100 parts of cellulose acetate fabric or yarn are then worked in the bath for ¼ hour. 20 parts of Glauber's salt are now added and the temperature raised to 80° C. when a further 20 parts of Glauber's salt are added. Dyeing is continued at this temperature for one hour, at the end of which time the goods are rinsed and dried. A full golden yellow shade is obtained.

Having described our invention what we desire to secure by Letters Patent is:

1. Dyestuffs in which the sole chromophore groups are nitro groups and which are aryl compounds which contain at least one nuclear nitro group, at least one nuclear amino group and a sulphato group attached to a lower alkyl group which is linked to the aromatic residue by a linkage selected from the group consisting of direct linkage, linkage through an oxygen atom, linkage through a sulphur atom and linkage through an —NR— group, where R is a substituent selected from the group consisting of hydrogen and an alkyl group.

2. Dyestuffs in which the sole chromophore groups are nitro groups and which are aryl compounds which contain at least one nuclear nitro group and a sulphato-alkyl group selected from the group consisting of sulphato-methyl, sulphato-ethyl and sulphato-propyl which is linked to the aromatic residue through an —NR— group, where R is a substituent selected from the group consisting of hydrogen and an alkyl group.

3. Dyestuffs in which the sole chromophore groups are nitro groups and which are aryl compounds which contain at least two aryl nuclei linked together by a linkage selected from the group consisting of direct linkage, linkage through an oxygen atom, through a sulphur atom, through an —NH— group, through a —CH₂— group, through a —CO— group and through a —CO—NH— group, and which contain a sulphato-alkyl group selected from the group consisting of sulphato-methyl, sulphato-ethyl and sulphato-propyl, a nuclear nitro group and an auxochrome group.

4. Dyestuffs in which the sole chromophore groups are nitro groups and which are aryl compounds which contain at least two aryl nuclei linked together by a linkage selected from the group consisting of direct linkage, linkage through an oxygen atom, through a sulphur atom, through an —NH— group, through a —CH₂— group, through a —CO— group and through a —CO—NH— group, and which contain a nitro group as a substituent in an aryl nucleus and a sulphato-alkyl group selected from the group consisting of sulphato-methyl, sulphato-ethyl and sulphato-propyl linked to an aryl nucleus through an —NR— group, where R is a substituent selected from the group consisting of hydrogen and an alkyl group.

5. Dyestuffs in which the sole chromophore groups are nitro groups and which are diphenylamines which contain a nitro group as a substituent in one of the phenyl nuclei, an amino group as a substituent in one of the phenyl nuclei and a sulphato-alkyl group selected from the group consisting of sulphato-methyl, sulphato-ethyl and sulphato-propyl linked to one of the phenyl nuclei by a linkage selected from the group consisting of direct linkage, linkage through an oxygen atom, through a sulphur atom and through an —NR— group, where R is a substituent selected from the group consisting of hydrogen and an alkyl group.

6. Dyestuffs in which the sole chromophore groups are nitro groups and which are diphenyl amines which contain a nitro group as a substituent in one of the phenyl nuclei and a sulphato-alkyl group selected from the group consisting of sulphato-methyl, sulphato-ethyl and sulphato-propyl linked to one of the phenyl nuclei through an —NR— group, where R is a substituent selected from the group consisting of hydrogen and an alkyl group.

7. Dyestuffs in which the sole chromophore groups are nitro groups and which are diphenyl amines which contain a nitro group as a substituent in one of the phenyl nuclei and a sulphato-alkyl group selected from the group consisting of sulphato-methyl, sulphato-ethyl and sulphato-propyl linked to the other of the phenyl nuclei through an —NR— group, where R is a substituent selected from the group consisting of hydrogen and an alkyl group.

8. Dyestuffs in which the sole chromophore groups are nitro groups and which are diphenyl amines which contain a nitro group as a substituent in one of the phenyl nuclei and a sulphato-alkyl group selected from the group consisting of sulphato-methyl, sulphato-ethyl and sulphato-propyl linked to the other of the phenyl nuclei through an oxygen atom.

9. The dyestuff 2,4-dinitro-4'-N.ethyl-sulphato-ethyl-amino-diphenylamine.

10. The dyestuff 2,4-dinitro-4'-sulphato-ethoxy-diphenylamine.

11. Process for the manufacture of dyestuffs, which comprises treating with a sulphating agent aryl compounds which contain nuclear nitro groups as sole chromophore groups and which contain at least one auxochrome group and at least one hydroxyalkyl group.

12. Process for the manufacture of dyestuffs, which comprises treating with sulphuric acid aryl compounds which contain nuclear nitro groups as sole chromophore groups and which contain at least one auxochrome group and at least one hydroxyalkyl group in which the alkyl radicle is a lower alkyl radicle.

13. Process for the manufacture of dyestuffs, which comprises subjecting to treatment with sulphuric acid aryl compounds which contain nuclear nitro groups as sole chromophore groups, at least one nuclear amino group and a hydroxyalkyl group selected from the group consisting of hydroxymethyl, hydroxyethyl and hydroxypropyl groups which is linked to the aryl residue by a linkage selected from the group consisting of direct linkage, linkage through an oxygen atom, linkage through a sulphur atom and linkage through an —NR— group, where R is a substituent selected from the group consisting of hydrogen and an alkyl group.

14. Process for the manufacture of dyestuffs, which comprises subjecting to treatment with sulphuric acid aryl compounds which contain nuclear nitro groups as sole chromophore groups and which contain a hydroxyalkyl group selected from the group consisting of hydroxymethyl, hydroxyethyl and hydroxypropyl groups linked to the aryl residue through an —NR— group, where R is a substituent selected from the group consisting of hydrogen and an alkyl group.

15. Process for the manufacture of dyestuffs, which comprises subjecting to treatment with sulphuric acid aryl compounds which contain nuclear nitro groups as sole chromophore groups, at least one hydroxyalkyl group selected from the group consisting of hydroxymethyl, hydroxyethyl and hydroxypropyl groups and an auxochrome group, and which contain at least two aryl nuclei linked together by a linkage selected from the group consisting of direct linkage, linkage through an oxygen atom, through a sulphur atom, through an —NH— group, through a —CH₂— group, through a —CO— group and through a —CO—NH— group.

16. Process for the manufacture of dyestuffs, which comprises subjecting to treatment with sulphuric acid aryl compounds which contain nuclear nitro groups as sole chromophore groups, which contain at least two aryl nuclei linked together by a linkage selected from the group consisting of direct linkage, linkage through an oxygen atom, through a sulphur atom, through an —NH— group, through a —CH₂— group, through a —CO— group and through a —CO—NH— group, and which contain a hydroxy-alkyl group selected from the group consisting of hydroxymethyl, hydroxyethyl and hydroxypropyl groups linked to an aryl nucleus through an —NR— group, where R is a substituent selected from the group consisting of hydrogen and an alkyl group.

17. Process for the manufacture of dyestuffs, which comprises subjecting to treatment with sulphuric acid aryl compounds which contain nuclear nitro groups as sole chromophore groups and which are diphenylamines which contain a nitro group as a substituent in one of the phenyl nuclei, an amino group as a substituent in one of the phenyl nuclei and a hydroxy-alkyl group selected from the group consisting of hydroxymethyl, hydroxyethyl and hydroxypropyl groups linked to one of the phenyl nuclei by a linkage selected from the group consisting of direct linkage, linkage through an oxygen atom, linkage through a sulphur atom and linkage through an —NR— group, where R is a substituent selected from the group consisting of hydrogen and an alkyl group.

18. Process for the manufacture of dyestuffs, which comprises subjecting to treatment with sulphuric acid aryl compounds which contain nuclear nitro groups as sole chromophore groups and which are diphenylamines which contain a nitro group as a substituent in one of the phenyl nuclei and a hydroxy-alkyl group selected from the group consisting of hydroxymethyl, hydroxyethyl and hydroxypropyl groups linked to one of the phenyl nuclei through an —NR— group, where R is a substituent selected from the group consisting of hydrogen and an alkyl group.

19. Process for the manufacture of dyestuffs, which comprises subjecting to treatment with sulphuric acid aryl compounds which contain nuclear nitro groups as sole chromophore groups and which are diphenylamines which contain a nitro group as a substituent in one of the phenyl nuclei and a hydroxyalkyl group selected from the group consisting of hydroxymethyl, hydroxyethyl and hydroxypropyl groups linked to the other of the phenyl nuclei through an —NR— group, where R is a substituent selected from the group consisting of hydrogen and an alkyl group.

20. Process for the manufacture of dyestuffs, which comprises subjecting to treatment with sulphuric acid aryl compounds which contain nuclear nitro groups as sole chromophore groups and which are diphenylamines which contain a nitro group as a substituent in one of the phenyl nuclei and a hydroxyalkyl group selected from the group consisting of hydroxymethyl, hydroxyethyl and hydroxypropyl groups linked to the other of the phenyl nuclei through an oxygen atom.

21. Process for the manufacture of dyestuffs, which comprises subjecting to treatment with sulphuric acid the compound 2,4-dinitro-4'-(N-ethyl-N-β-hydroxyethyl-amino)-diphenylamine.

22. Process for the manufacture of dyestuffs, which comprises subjecting to treatment with sulphuric acid the compound 2,4-dinitro-4'-hydroxy-ethoxy-diphenylamine.

GEORGE HOLLAND ELLIS.
HENRY CHARLES OLPIN.